United States Patent
Ekins et al.

(10) Patent No.: US 10,275,625 B2
(45) Date of Patent: Apr. 30, 2019

(54) MARKER SYSTEM TO CONFIRM PROPER AGROCHEMICAL COMPOSITIONS AND FORMULATIONS

(71) Applicant: FMC Corporation, Philadelphia, PA (US)

(72) Inventors: Richard G. Ekins, Coatesville, PA (US); Corbett M. Hancock, Celina, TX (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 15/662,511

(22) Filed: Jul. 28, 2017

(65) Prior Publication Data

US 2018/0032776 A1   Feb. 1, 2018

Related U.S. Application Data

(60) Provisional application No. 62/368,649, filed on Jul. 29, 2016.

(51) Int. Cl.
G06F 7/14 (2006.01)
G06K 7/14 (2006.01)

(52) U.S. Cl.
CPC ......... *G06K 7/1413* (2013.01); *G06K 7/1417* (2013.01)

(58) Field of Classification Search
CPC .................................................. G06K 7/1413
USPC ........................................ 235/462.1; 210/104
See application file for complete search history.

(56) References Cited

U.S. PATENT DOCUMENTS

| | | | |
|---|---|---|---|
| 4,824,562 A * | 4/1989 | Carson ............... | B01D 17/0208 210/104 |
| 6,190,565 B1 * | 2/2001 | Bailey ................... | F04B 23/025 210/110 |
| 2013/0110292 A1 | 5/2013 | Peterson et al. | |
| 2013/0271758 A1 | 10/2013 | Marchant et al. | |
| 2014/0273265 A1 * | 9/2014 | Feingold ................ | G01N 27/08 436/163 |
| 2014/0348707 A1 * | 11/2014 | King Smith ....... | G01N 27/4148 422/82.03 |
| 2014/0358381 A1 * | 12/2014 | Holland ................. | G01N 21/55 701/50 |
| 2015/0093426 A1 | 4/2015 | Martin et al. | |

OTHER PUBLICATIONS

Garcia et al., "A Review of Wireless Sensor Technologies and Applications in Agriculture and Food Industry: State of the Art and Current Trends," Sensors 2009, Jun. 2009.
Bright 'glow stick' marker for cells, American Chemical Society, Mar. 8, 2017.

* cited by examiner

*Primary Examiner* — Allyson N Trail
(74) *Attorney, Agent, or Firm* — Fox Rothschild LLP

(57) ABSTRACT

A marker system including at least one sensor configured to be positioned relative to a container to obtain information regarding content within the container, and a control module which receives the sensed information. Based on the sensed information, the system determines if the content of the container is approved for use for the particular application and/or equipment. By way of example, the information being sensed can be a marker chemical added to the content of the container, an ingredient in the container, or information read from outside the container.

28 Claims, 4 Drawing Sheets

MARKER SYSTEM TO CONFIRM PROPER AGROCHEMICAL COMPOSITIONS AND FORMULATIONS

CROSS REFERENCE TO RELATED APPLICATIONS

This application claims the benefit of U.S. provisional patent application Ser. No. 62/368,649, filed on 29 Jul. 2016, and is related to International application number PCT/US17/44283, filed on 28 Jul. 2017, both of which applications are incorporated herein by reference in their entirety.

FIELD OF THE INVENTION

The present invention relates to systems, apparatus and methods for applying agrochemical compositions and formulations, and more particularly, to the use of a marker or taggant to ensure that the compositions and formulations are approved for the specific application and/or equipment.

BACKGROUND OF THE INVENTION

Various delivery systems have been developed which utilize specific techniques for formulating and applying agrochemicals, which include ingredients, compounds and other compositions such as insecticides, herbicides, fungicides, pesticides, fertilizers, and plant nutrients. The various agrochemicals are formulated with specific ingredients in desired amounts for specific applications. The delivery systems utilize specialized equipment to deliver the compositions and formulations for the specific applications. Utilizing ingredients, active or non-active, which are not specifically formulated for a particular application, can result in the delivery of an improper formulation that may not provide the desired efficacy and/or work with the particular equipment. Additionally, in some systems with specialized equipment, use of non-intended ingredients can result in damage to the equipment.

As an example, one type of agrochemical delivery system involves the in-furrow application of a foamed agrochemical, using specialized delivery equipment, at the same time the seeds are planted. Examples of such devices are disclosed in US patent publication 2015/0093426, which is hereby incorporated by reference herein, and also includes FMC Corporation's 3DRIVE 3D™ system. Such equipment, carried preferably on planting equipment such as a planter, tractor or cart towed behind the planter, creates the foam from the agrochemical carried on board. The planter delivers the seeds and foam into the furrow, and backfills the furrow with dirt as part of the seeding process. Thus, the user, e.g., the driver of the tractor, is unable to see if the agrochemical was applied as desired before the furrow is covered. The user must trust that the agrochemical used was authentic and applied properly. If a non-approved or unauthorized product is used, the proper efficacy may not be obtained, and the user may never know it.

Accordingly, there is a need for a system which can control the use of agrochemicals with agricultural equipment, and which allows only approved agrochemicals to be used.

SUMMARY OF THE INVENTION

In one embodiment, the present invention provides a marker system for approving an agrochemical for use with agricultural equipment. The system includes a sensor configured to sense information regarding the agrochemical within a container. A control module is provided in communication with the sensor for receiving sensed information therefrom and, based on the sensed information, is configured to selectively control the agricultural equipment to use or not use the agrochemical within the container.

The sensor can include a chemical sensor with a probe configured to extend into the container and sense whether a specific chemical marker is within the container. In another form, the sensor is configured to sense information provided external to the container, such as a bar code.

In another form, the invention provides a method of determining if an agrochemical is approved for use with the agrochemical equipment. The method includes providing information with a container of the agrochemical, which information can be used to determine if the agrochemical is approved for the use. The information is sensed and communicated to a control module configured to determine if the agrochemical is approved. Based on the sensed information, the method determines if the agrochemical is approved. If approved, the agrochemical is permitted to be used with the agricultural equipment; otherwise, the agrochemical is not permitted to be used.

Other features and embodiments are provided in further discussed below.

BRIEF DESCRIPTION OF THE DRAWINGS

The accompanying drawings, which are incorporated herein and constitute part of this specification, illustrate the presently preferred embodiments of the invention and, together with the general description given above and the detailed description given below, serve to explain the features of the invention. In the drawings.

DETAILED DESCRIPTION OF THE INVENTION

Figure 1:
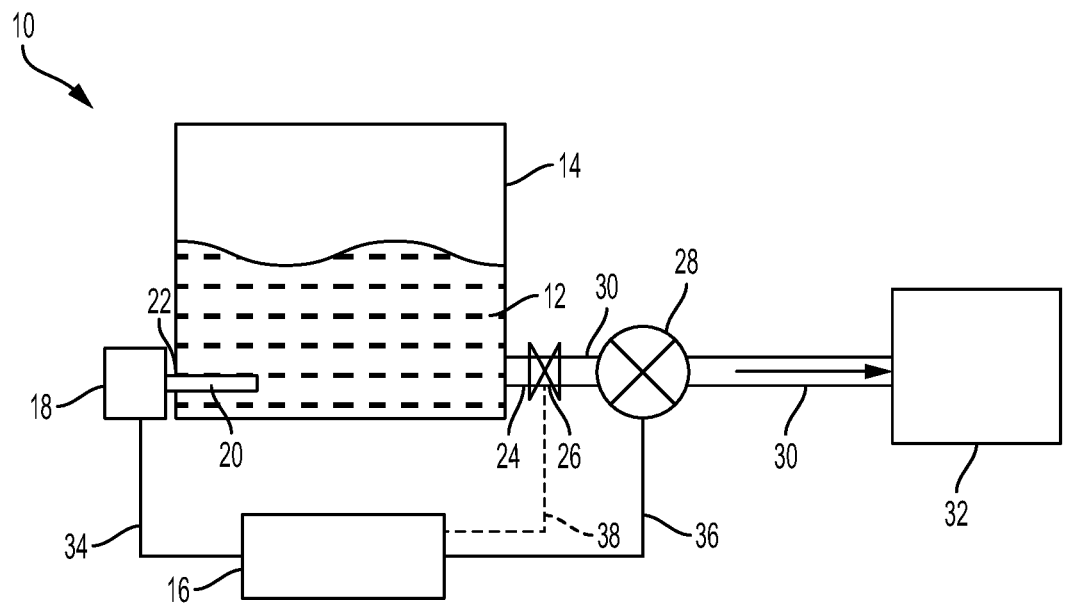
FIG. 1 is a schematic view illustrating a marker system in accordance with an embodiment of the invention positioned relative to an ingredient container, which system uses a sensor that contacts the ingredient to obtain information about it.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Illustrated in FIG. 1, an exemplary marker system 10 in accordance with an embodiment of the invention for use with agrochemical delivery equipment 32. The marker system 10 will determine if an agrochemical 12 in a container 14 is approved for use. If so, the system will allow the product to be used. If not, the system will not allow such use.

For purposes herein, agrochemical is defined broadly to include any and all chemicals, solutions, liquids, compounds, formulations, and the like that may be used with agricultural equipment. The system 10 is now described in further detail.

The container 14 used with the system 10 can include any container or tank that can hold the agrochemical 12 and which can work with the system 10, including containers of product from manufacturers that can be connected directly to the system 10, and containers and tanks of system 10 into which agrochemical 12 from the manufacturer can be added. As an example, manufactures can supply agrochemicals in containers 14 designed to connect to the system 10, or the system 10 can include connections that will connect to the various containers 14 supplied by the manufacturers.

The marker system 10 generally includes a control module 16 and at least one sensor 18. The control module 16 can include a "computing device" or "electronic device" that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, and portable electronic devices such as smartphones, personal digital assistants, tablet computers, laptop computers and the like. The control module 16 may be a standalone device or may be integrated with computing or electronic devises already provided on the agricultural equipment 32.

The sensor 18 of the illustrated embodiment includes a probe 20 configured to extend into the container 10 to contact the agrochemical 12 therein. The probe 20 extends through a container opening 22. Any other suitable means for contacting the probe 20 with the contents of the container 14 may be used.

In the illustrated embodiment, the agrochemical 12 exits the container 14 through an outlet 24, which may include a valve 26, and which is connected to a pump 28. The pump 28, when operated to be on, moves the agrochemical 12 from the container 14 downstream through conduit 30 to the remainder of the product equipment 32. The conduit 30 can include piping, tubing, valves and other items associated with such equipment 32. It is appreciated that present system 10 can provide the agrochemical 12 to the delivery apparatus 32, such as the foam delivery apparatus set forth in U.S. patent publication 2015/0093426, a mixing tank, or other equipment that uses and dispenses the agrochemical 12. It is further appreciated that in one preferred embodiment, the system 10 is part of the equipment 32.

The control module 16 is in communication via communication line 34 with the sensor 18 to receive information therefrom about the agrochemical 12 within the container 14. The communication line 34 may be wired or wireless as is known in the art. The information obtained from the sensor 18 will be used to determine if the agrochemical 12 is approved for use in the current application and/or with the equipment 32. If the agrochemical 12 is an approved product, the system 10 will permit use of the agrochemical 12 with the equipment 32. If not approved, the system 10 will not permit such use.

In the illustrated embodiment, the control module 16 is also in communication via communication line 36 with the pump 28 by which the operation of the pump 28 can be controlled. Based on the information received by the control module 16 from the sensor 18, if the agrochemical 12 is an approved product, the control module 16 is configured to permit the pump 28 to move agrochemical 12 downstream to be used by and/or dispensed through the equipment 32. If the product is not approved, the control module 16 will not permit the pump 28 to move the agrochemical 12 downstream. It is appreciated that there are various ways by which the pump 28 can be controlled. For example, the control module 16 could operate the pump directly, i.e., turning it on if the agrochemical 12 is approved. Alternatively, the control module 16 could work with other devices and control modules, for example, operating the pump 28 only after approving the agrochemical 12 and receiving a further signal from another device such as a hand operated switch for the pump 28. As another alternative, the control module 16 can provide an indication that the agrochemical 12 is acceptable to other devices, which would then be capable of operating the pump 28. If it is determined that the agrochemical 12 is not acceptable, the controller would prevent the operation of the pump 28. Thus, in this embodiment, if the agrochemical 12 is not approved, the agrochemical 12 will remain in its container 14 for easy removal and replacement, thereby preventing contamination of the equipment 32 with unapproved agrochemical 12 and/or avoiding the need to drain and clean the equipment 32.

A single control module 16 as shown can be used for communicating with the sensor 18 and pump 28. Alternatively, individual control modules for each component can be used, which could communicate with one another.

It is appreciated that there are other means for preventing use of unapproved agrochemical 12. For example, as an alternative or in addition to the pump 28, the control module 16 could communicate via communication line 38 with the optional valve 26 (here an automatic valve) on the outlet 24 side of the container 14 to selectively open and close the valve 26, or allow the operation of the valve 26 by another means, thereby allowing only approved agrochemical 12 to exit the container 14.

The sensor 18 provides information about the agrochemical 12 to the control module 16 for determining if the agrochemical 12 is acceptable. In this illustrated embodiment, the sensor, via its probe 20, contacts the agrochemical 12 for obtaining information about the product. For example, the probe 20 may be configured to verify the existence of a marker chemical added to the agrochemical 12 by the manufacturer or some other ingredient indicating the acceptability of the product. Other types of sensors 18, such as information readers that sense information provided by the manufacturer on the outside of the container 14, or other information which is not mixed in with the agrochemical 12, e.g. barcodes, can also be used. Further details of such suitable sensors 18 are further described below.

Figure 2:
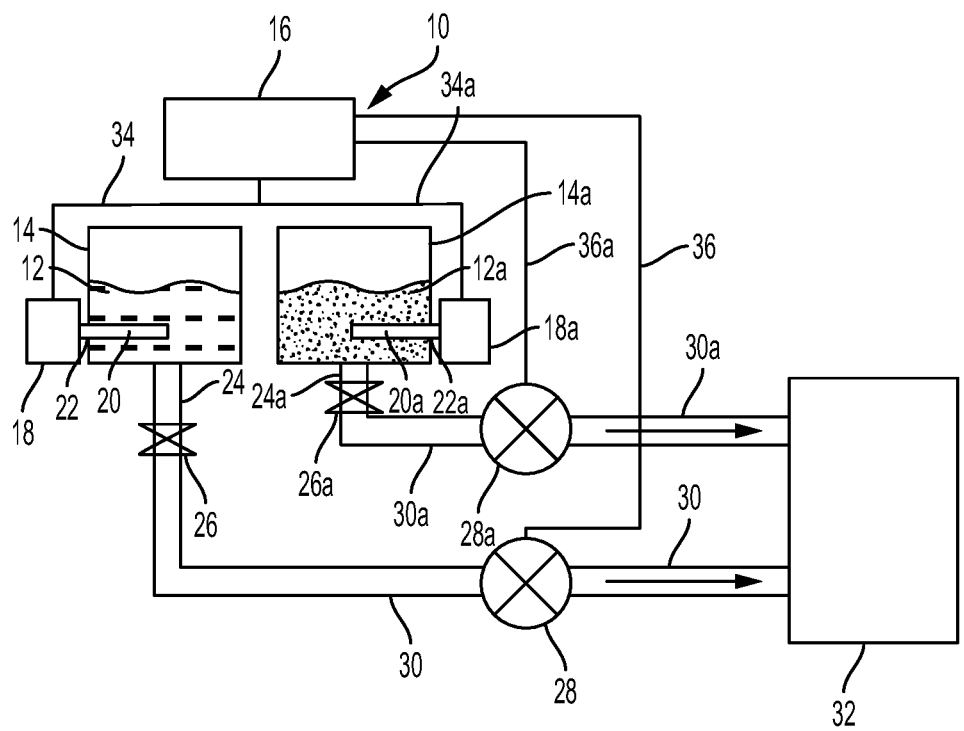
FIG. 2 is a schematic view illustrating the marker system similar to that in FIG. 1 used with two ingredient containers, each of which containers is connected to a respective pump.

With further reference to FIG. 2, an embodiment of the present invention that confirms the acceptability of two different agrochemicals 12, 12a, provided in separate containers 14, 14a, is now described. Here, the system 10 is similar to that described above with reference to FIG. 1, but is duplicated for the additional agrochemical 12a. The equipment 32, at least for this specific application, uses the two products 12, 12a, e.g. two different agrochemicals, to be disbursed, and which may be mixed, foamed, or otherwise processed prior to dispersion as required for the particular application.

As seen in FIG. 2, the products 12, 12a exit respective containers 14, 14a through respective outlets 24, 24a, each of which may include a respective valve 26, 26a, which are connected to respective pumps 28, 28a. The pumps 28, 28a, when turned on, move respective agrochemicals 12, 12a from the containers 14, 14a downstream through respective conduits 30, 30a to downstream sections of product delivery apparatus 32. The pumping of the products 12, 12a, from the containers 14, 14a, can be done simultaneously or at different times, depending on the requirements of the equipment 32.

Similar to that of FIG. 1, the system 10 shown in FIG. 2 includes two sensors 18, 18a, one for each container 14, 14a, with each sensor having a respective probe 20, 20a extending through a container opening 22, 22a. A single control module 16 can be used for communicating with the sensors 18, 18a via respective communication lines 34, 34a. The pumps 28, 28a, via respective communication lines 36, 36a likewise communicate with the single control module 16. Alternatively, individual control modules for each component, e.g., one for sensor 18 and respective pump 28, and another module for sensor 18a and pump 28a can be used. As noted above, the various communication lines, here 34, 34a, 36, and 36a, may take any suitable form, including wired and wireless.

As with the embodiment of FIG. 1, any suitable marker, including chemical and information markers and taggants, may be used which are capable of being sensed or detected to indicate an authentic or approved product (this is described in more detail below). In the present embodiment, the probes 20, 20a, are configured to sense specific chemical markers in the agrochemicals 12, 12a, which markers can include active ingredients therein. The agrochemicals 12, 12a in the different containers may be the same or different.

Based on the information received by the control module 16 from the sensors 18, 18b, the control module 16 is configured to allow approved products 12, 12a, to be pumped or otherwise moved downstream to be used and/or dispensed through the equipment 32. Any of the products 12, 12a not approved will not be permitted downstream. Depending on the equipment and/or application, it may be preferable to configure the system 10 not to permit either of the agrochemicals 12, 12a downstream if any one of them is not approved, particularly where both products 12, 12a are required for the particular application. Again, by preventing unapproved product from flowing downstream, the unapproved product 12 and/or 12a can be replaced with approved product without contaminating the equipment 32. As described above, although not illustrated here, other means of preventing use of unapproved agrochemicals can be used, such as controlling the valves 26, 26a.

It is appreciated that additional agrochemicals 12 (e.g., three or more) can be provided using additional containers 14 and related system 10 elements, e.g., sensors 18, pumps 28, etc., thereby ensuring acceptability of all agrochemicals.

Figure 3:
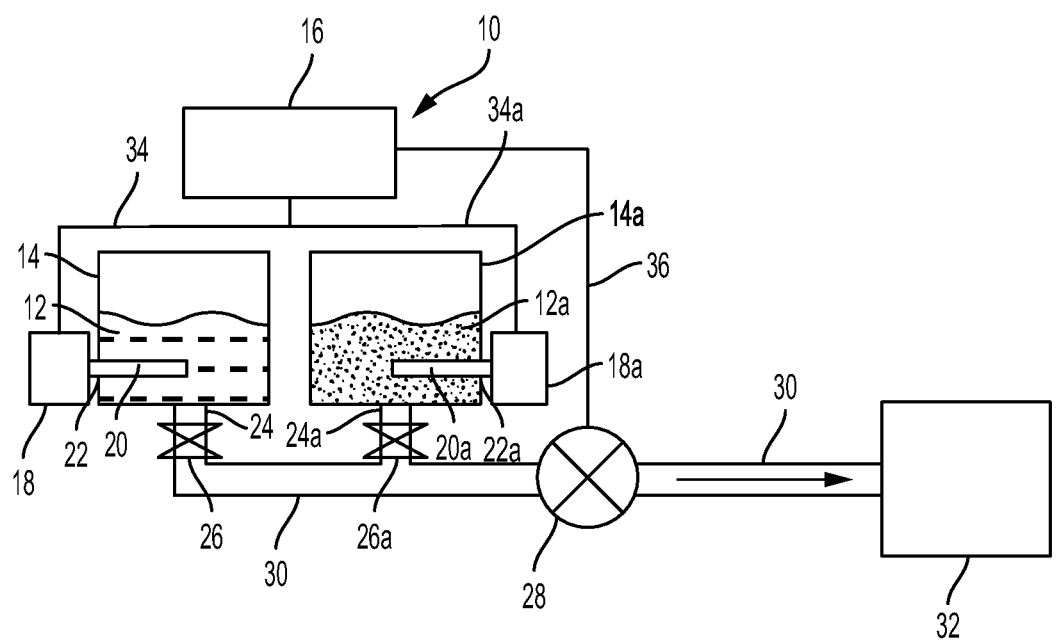
FIG. 3 is a schematic view illustrating the marker system similar to that in FIG. 1 positioned relative to two ingredient containers, both of which containers are connected to a common pump.

Another embodiment of the invention is now described with further reference to FIG. 3. This system 10 is similar to the previous embodiment of FIG. 2 and only the different features will be described. Here, rather than each product container 14 leading to a separate pump 18, 18a, the outlets 24, 24a of each container 14, 14a, after valves 26, 26a, lead to a common conduit 30, and to a single pump 28. If the agrochemical 12, 12a of either container 14, 14 is not an approved product, neither of the products 12, 12a will be allowed to proceed further in the equipment 32.

Figure 4:
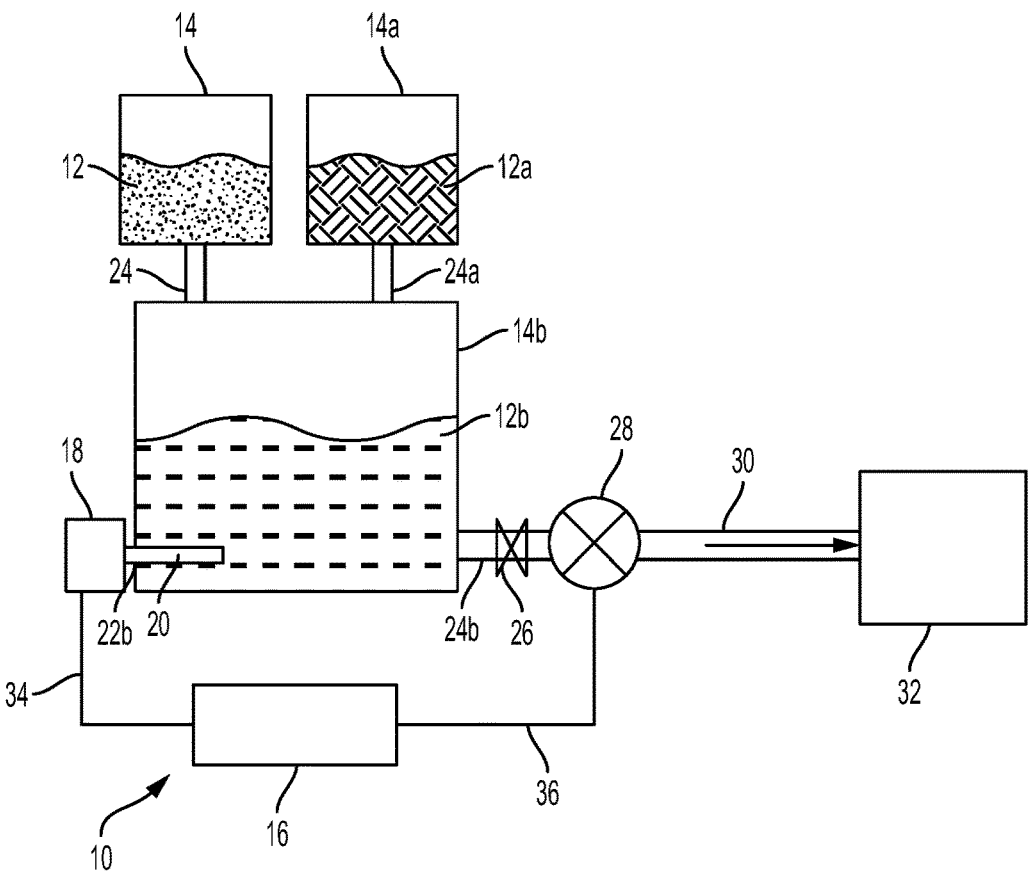
FIG. 4 is a schematic view of a marker system in accordance with the present invention positioned relative to a mixing container which receives ingredients from multiple ingredient containers.

Another embodiment of the present invention is now described with further reference to FIG. 4. Here, the system 10 includes one sensor 18 with probe 20 extending through an opening 22b of a mixing container 14b which receives ingredients 12, 12a from multiple containers 14, 14a via outlets 24, 24a. The ingredients are mixed in the container 14b to form a combined agrochemical 12b which exits the container 14b through an outlet 24b connected to the pump 28 which supplies the agrochemical 12b downstream via downstream piping 30 to equipment 32. The control module 16, in communication with the sensor 18 and pump 28 via respective communication lines 34, 36, confirms that the agrochemical 12b is acceptable for use and if so, allows the agrochemical 12b to proceed in the equipment 32 in the manner described above in regard to FIG. 1. Here, however, if the agrochemical 12b is not approved, it means that the sensor 18 did not receive information that approved product is in the mixing tank 14b, but does not provide information as to whether one or both of the products 12 and 12a, of respective containers 14, 14a, contained unapproved product.

The various sensor and container arrangements are provided as examples only. It is understood that the system 10 may utilize any desired number of sensors 18, which may be positioned to sense individual markers in the respective containers. Additionally, the supply equipment, e.g., the pump and downstream pumping, may have various configurations, and the control module may be configured to control other agricultural equipment other than a pump to control downstream delivery of the ingredients/composition.

Any suitable marker, including chemical and information markers and taggants, may be used which are capable of being sensed or detected to indicate an authentic/approved agrochemical 12. In the previously described embodiments, the probes 20, 20a are configured to sense a specific chemical marker used within the ingredient or composition 12, 12a. The sensors 18, 18a are configured to obtain information indicating whether or not the specific chemical marker was detected by the respective probe, and provide this information to the control modules 16, 16a. The control modules 16, 16a, based on the information from the sensors, are configured (e.g., programmed) to selectively control the use of the agrochemicals 12, 12a. For example, if it is determined that the necessary marker is present, indicating an approved product, the control modules 16, 16a will allow the approved product to be used. On the other hand, if any of the sensors 18, 18a fail to provide a signal indicative of the presence of the necessary marker, the control modules 16, 16a are configured to prevent the pumps 28, 28a from activating, or otherwise allowing the products to travel downstream.

Figure 5:
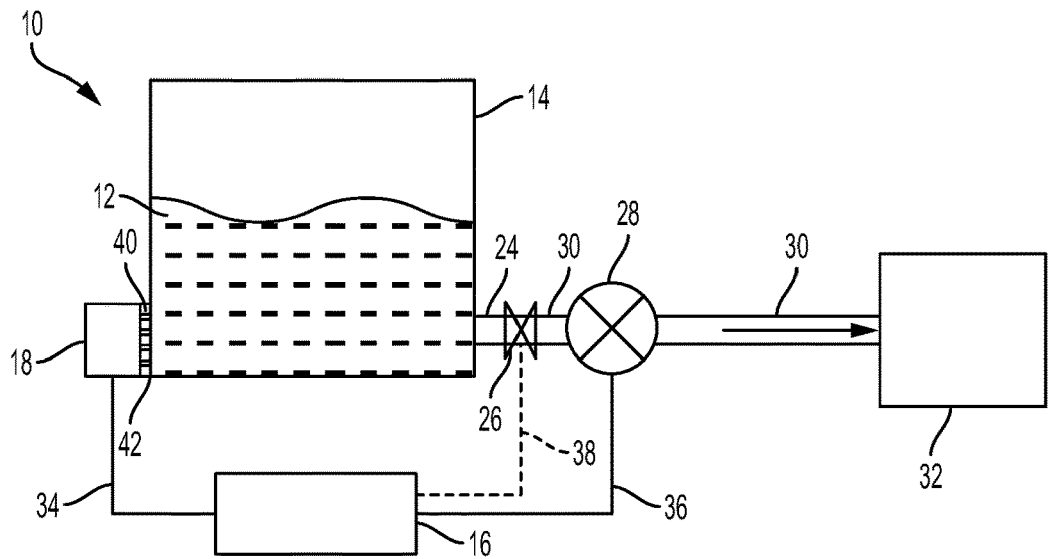
FIG. 5 is a schematic view illustrating a marker system in accordance with another embodiment of the invention positioned relative to an ingredient container, which system uses an information reader to obtain information about the ingredient.
Figure 6:
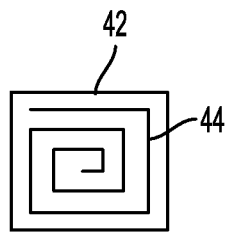
FIG. 6 is a plan view of an exemplary information plate in accordance with the marker system illustrated in FIG. 5.

Referring to FIGS. 5 and 6, a system 10 in accordance with another embodiment of the invention is now described. The system 10 is similar to the previous embodiment described with reference to FIG. 1, and only the distinct components will be described. A difference in the present embodiment is that the sensor 18 is an external sensor which has a reader 40 configured to read information associated with the container 12 such as that from an information plate 42, e.g., a sticker or other external item attached to the container 12. Here, the information plate 42 includes an information strip 44 which stores information about the contents of the container 12 and which may include additional information such as the prior use of the specific container. The reader 40 and information strip 44 may take various configurations, for example, electrical contacts, magnetic contacts, Blue Tooth Communication, microchips, bar code, QR code, camera reader, security inks, or RFID. Various other marker technologies for authenticating products or preventing counterfeits may be utilized.

When the sensor 18 is associated with a respective information plate 42, the sensor 18 senses, e.g., reads the information which is communicated to the control module 16. The control module 16 is configured (e.g., programmed) to determine, based on the information received, whether the contents of the container 12 is approved for the specific application and/or equipment 32 and then controls the pump 18 accordingly. For example, the control module 16 will determine if the agrochemical 12 of the container 14 is permitted for use with the equipment. To prevent a user from reusing the same container with different contents, the control module 16 also may be programmed to determine from the signaled identity whether the container 14 has been used before or not and how long ago it was used. The control programming may be established that any container 14 may be used only once. Alternatively, the control programming may be established that a container 14 may be utilized only for a prescribed period, for example, for 24 hours from when it is first associated with the sensor 18. In other aspects, the system 10 operates as described in the previous embodiment.

It is appreciated that the embodiment described with reference to FIG. 5 pertaining to the use of a sensor 18 that includes a reader 40 is applicable to each of the prior embodiments described above as well. For example, the embodiment described above with reference to FIG. 2 could be modified so that the sensors 18, 18a include a reader 40, 40a respectively reading information, such as barcode information, rather than the probes 20, 20a. Otherwise, the embodiments would work similarly.

Figure 7:
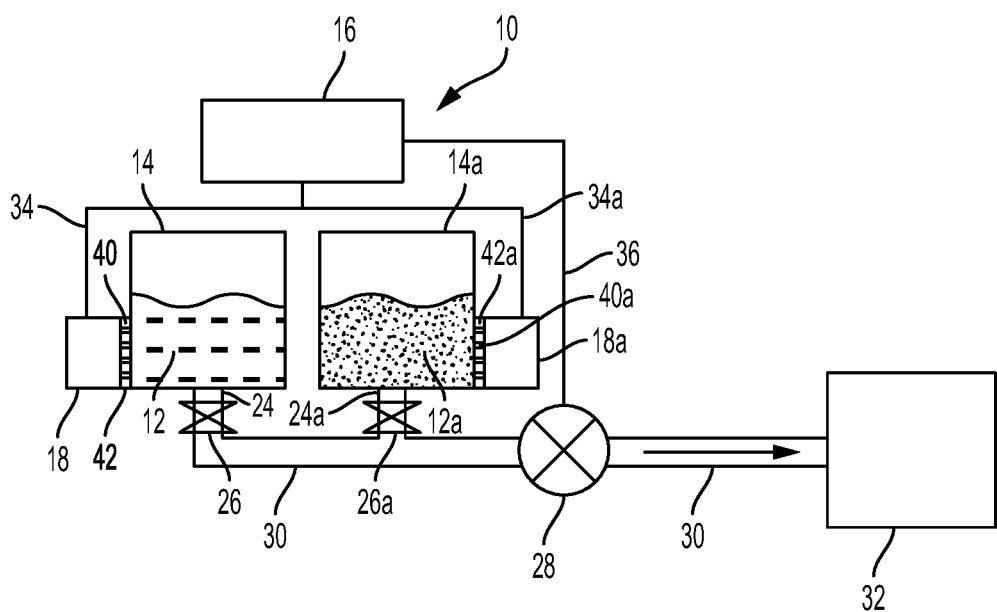
FIG. 7 is a schematic view illustrating the marker system similar to that in FIG. 4 positioned relative to two ingredient containers, both of which containers are connected to a common pump.

Another example of the similarity of the various embodiments is illustrated with further reference to FIG. 7. The embodiment illustrated in FIG. 7 is similar to that of FIG. 3, the key difference being at the embodiment of FIG. 7 includes sensors 18, 18a that have respective readers 40, 40a, instead of probes 20, 20a. Otherwise, the two embodiments operate in a similar manner.

It is further appreciated that different types of sensors 18 can be combined in a single system 10. For example, the system 10 as shown in FIG. 1 could be combined with the system as shown in FIG. 5 for the same container 14. Here, the two different sensors 18 would communicate with the common control module 16. In this configuration, both the chemical marker within the agrochemical 12 as well as the necessary information to be read by the reader 40 would be required before the agrochemical 12 would be permitted to be received by the agricultural equipment 32.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A marker system for approving an agrochemical for use with agricultural equipment, comprising:
a sensor configured to sense information regarding the agrochemical within a container;
a control module in communication with said sensor for receiving sensed information therefrom and, based on the sensed information, is configured to selectively control the agricultural equipment to use or not use the agrochemical within the container; and
wherein said information comprises a chemical marker in said agrochemical and provided in addition to another chemical within said container which contributes to the efficacy of the agrochemical, and said sensor is a chemical sensor configured to sense the presence of said chemical marker.

2. The marker system according to claim 1 wherein said sensor includes a probe configured for contacting the agrochemical within the container.

3. The marker system according to claim 1 wherein said control module, based on the information sensed, permits or prevents delivery of the agrochemical from the container to the agricultural equipment.

4. The marker system according to claim 1 wherein said control module comprises multiple control modules.

5. The marker system according to claim 1 wherein said system includes a pump for moving said agrochemical from said container to said agricultural equipment, and said control module is in communication with said pump to control the operation thereof.

6. A marker system for approving an agrochemical for use with agricultural equipment, comprising:
a sensor configured to sense information regarding the agrochemical within a container, said sensor comprising a reader configured to read information associated with the container, and wherein said information to be read is disposed outside of said container; and
a control module in communication with said sensor for receiving sensed information therefrom and, based on the sensed information, is configured to determine whether the agrochemical is approved for use with the agricultural equipment and to selectively control the agricultural equipment to use or not use the agrochemical within the container based on the determination made as to whether the agrochemical is approved for use with the agricultural equipment.

7. The marker system according to claim 6 wherein said sensor is configured for sensing printed information provided on the container.

8. The marker system according to claim 6 wherein said control module, based on the information sensed, permits or prevents delivery of the agrochemical from the container to the agricultural equipment.

9. The marker system according to claim 6 wherein said system includes a pump for moving said agrochemical from said container to said agricultural equipment, and said control module is in communication with said pump to control the operation thereof.

10. A marker system for approving an agrochemical for use with agricultural equipment, comprising:
at least two sensors configured to sense information regarding the agrochemical within a container;
a control module in communication with said two sensors for receiving sensed information therefrom and, based on the sensed information, is configured to selectively control the agricultural equipment to use or not use the agrochemical within the container;

wherein one of said two sensors is a chemical sensor configured to sense the presence of a chemical marker within the container, and the other of said two sensors is configured to sense information provided externally to the container.

11. The marker system according to claim 10 wherein said other of two sensors comprises a reader configured to read information associated with the container, and wherein said information to be read is disposed outside of said container.

12. The marker system according to claim 10 wherein said chemical marker is provided in addition to other chemicals within said container which contribute to the efficacy of the agrochemical.

13. The marker system according to claim 10 wherein said system includes a pump for moving said agrochemical from said container to said agricultural equipment, and said control module is in communication with said pump to control the operation thereof.

14. A marker system for approving an agrochemical for use with agricultural equipment, comprising:
a first sensor configured to sense information regarding the agrochemical within a first container;
a control module in communication with said first sensor for receiving sensed information therefrom and, based on the sensed information, is configured to selectively control the agricultural equipment to use or not use the agrochemical within the first container;
a second sensor configured to sense information regarding a second agrochemical within a second container; and
said control module is configured to receive sensed information from said second sensor and, based on the sensed information from said second sensor, is configured to selectively control said agricultural equipment to use or not use the second agrochemical within the second container.

15. The marker system according to claim 14 wherein said control module, based on the information sensed, permits or prevents the delivery of the first and second agrochemicals from the respective first and second containers to the agricultural equipment.

16. The marker system according to claim 14 wherein said first sensor comprises a reader configured to read information associated with the container, and wherein said information to be read is disposed outside of said container.

17. The marker system according to claim 14 wherein said information regarding the agrochemical within said first container comprises a chemical marker in said agrochemical, said first sensor is a chemical sensor configured to sense the presence of said chemical marker, and wherein said chemical marker is provided in addition to other chemicals within said first container which contribute to the efficacy of the agrochemical.

18. The marker system according to claim 14 wherein said control module comprises multiple control modules.

19. A marker system for approving an agrochemical for use with agricultural equipment, comprising:
a sensor configured to sense information regarding the agrochemical within a container;
a control module in communication with said sensor for receiving said sensed information therefrom and, based on the sensed information, is configured to determine whether the agrochemical is approved for use with the agricultural equipment and to selectively control the agricultural equipment to use or not use the agrochemical within the container based on the determination made as to whether the agrochemical is approved for use with the agricultural equipment;
wherein said system includes a pump for moving said agrochemical from said container to said agricultural equipment, and said control module is in communication with said pump to control the operation thereof to use or not use the agrochemical within the container based on the determination made as to whether the agrochemical is approved for use with the agricultural equipment.

20. The marker system according to claim 14 wherein said system includes a pump for moving said agrochemical from said container to said agricultural equipment, and said control module is in communication with said pump to control the operation thereof.

21. The marker system according to claim 19 wherein said sensor comprises a reader configured to read information associated with the container, and wherein said information to be read is disposed outside of said container.

22. The marker system according to claim 19 wherein said information comprises a chemical marker in said agrochemical, said sensor is a chemical sensor configured to sense the presence of said chemical marker, and said chemical marker is provided in addition to other chemicals within said container which contribute to the efficacy of the agrochemical.

23. A method of determining if an agrochemical is approved for use with agrochemical equipment, comprising:
(a) providing information with a container of the agrochemical, which information can be used to determine if the agrochemical is approved for said use, wherein said information comprises a chemical marker in the container which is provided in addition to the agrochemical within said container;
(b) sensing said information;
(c) communicating the sensed information to a control module configured to determine if the agrochemical is approved;
(d) based on the sensed information, determining if the agrochemical is approved; and
(e) upon approval of the agrochemical, permitting the agrochemical to be used with said agricultural equipment, otherwise not permitting the agrochemical to be used with said agricultural equipment.

24. The method according to claim 23 wherein step (e) comprises permitting the approved agrochemical to be delivered from the container to the agricultural equipment.

25. The method according to claim 23 wherein step (e) comprises: upon approval of the agrochemical, permitting the operation of a pump to deliver the agrochemical from the container to the agricultural equipment, otherwise not permitting operation of the pump.

26. A method of determining if an agrochemical is approved for use with agrochemical equipment, comprising:
(a) providing information with a container of the agrochemical, which information can be used to determine if the agrochemical is approved for the use with the agrochemical equipment, wherein said information comprises information provided outside of the container;
(b) sensing said information;
(c) communicating the sensed information to a control module configured to determine if the agrochemical is approved;
(d) based on the sensed information, determining if the agrochemical is approved for the use with the agrochemical equipment; and
(e) upon approval of the agrochemical, permitting the agrochemical to be used with said agricultural equipment, otherwise not permitting the agrochemical to be used with said agricultural equipment.

27. The method according to claim 26 wherein step (e) comprises: upon approval of the agrochemical, permitting the operation of a pump to deliver the agrochemical from the container to the agricultural equipment, otherwise not permitting operation of the pump.

28. The method according to claim 26 wherein step (e) comprises permitting the approved agrochemical to be delivered from the container to the agricultural equipment.

* * * * *